United States Patent
Chien et al.

(10) Patent No.: US 8,597,000 B2
(45) Date of Patent: Dec. 3, 2013

(54) STRUCTURAL IMPROVEMENT OF A CANNED MOTOR PUMP

(75) Inventors: Huan-Jan Chien, Lujhu Township, Taoyuan County (TW); Ching-Chang Wang, Lujhu Township, Taoyuan County (TW); Chih-Kuan Shih, Lujhu Township, Taoyuan County (TW)

(73) Assignee: Assoma Inc., Taoyuan County (TW)

( * ) Notice: Subject to any disclaimer, the term of this patent is extended or adjusted under 35 U.S.C. 154(b) by 626 days.

(21) Appl. No.: 12/727,026

(22) Filed: Mar. 18, 2010

(65) Prior Publication Data

US 2010/0272592 A1    Oct. 28, 2010

(30) Foreign Application Priority Data

Apr. 28, 2009    (TW) .............................. 98114074 A

(51) Int. Cl.
    *F04B 35/04*    (2006.01)
(52) U.S. Cl.
    USPC ................... 417/423.12; 417/423.7; 417/368; 417/369
(58) Field of Classification Search
    USPC ................... 417/423.7, 423.12, 365, 368, 369
    See application file for complete search history.

(56) References Cited

U.S. PATENT DOCUMENTS 6,350,109 B1 *   2/2002   Brunet et al. .................. 417/365

* cited by examiner

*Primary Examiner* — Charles Freay
*Assistant Examiner* — Patrick Hamo
(74) *Attorney, Agent, or Firm* — Pro-Techtor Int'l Services

(57) ABSTRACT

The present invention discloses structure improvement of a canned motor pump, and more particular to a canned motor pump which is a plastic pump or a pump with plastic lining to transfer chemical liquids, wherein a support structure of a rotor system is improved to provide a high-rigidity cantilever stationary shaft to satisfy all kinds of requirements. The high-rigidity cantilever stationary shaft of the present invention comprises a metal shaft, which is locked tightly at a motor rear casing with a nut to compress a ceramic shaft sleeve and the motor rear casing to form a complex cantilever stationary shaft; a ceramic shaft sleeve, which provides hydraulic bearing and an axial thrust bearing functions; a motor rear casing, which enhances the stiffness of the stationary shaft for supporting rotation of the motor rotor; a containment shell, which provides a sealing function to the ceramic sleeve, in addition, the containment shell is provided with a central hole allowing the metal shaft to pass through, and an inner space is used to hold the motor rotor and to provide a sealing function to a motor stator winding.

9 Claims, 5 Drawing Sheets

STRUCTURAL IMPROVEMENT OF A CANNED MOTOR PUMP

BACKGROUND OF THE INVENTION a) Field of the Invention

The present invention relates to a seal-less canned motor pump, and more particular to structural improvement of a canned motor pump which is used especially in a plastic pump or a pump with plastic lining to transfer, pressurize and circulate high corrosive chemical liquids. Process chemical liquids are very corrosive, in addition that some of the liquids temperature could reach 85° C. in manufacturing processes at atmosphere pressure, the stiffness of plastic parts will be decreased significantly and deformation will be formed. For the conventional plastic or plastic lining seal-less canned motor pump with stationary shaft, which could be both-end supported or cantilever, the both-end supported shaft has a front shaft holder and a containment shell holder, and the cantilever one has a strengthened containment shell holder only. Owing to all the above structures are with lower stiffness, therefore reliability and performance will be reduced in a great deal. The structural improvement disclosed by the present invention is able to improve the reliability and lifetime of operation.

b) Description of the Prior Art

A metallic seal-less canned motor pump is applied in many industries today, the motor is induction motor or permanent magnet motor, this kind of pump is especially designed for corrosion-resistance and leak-proof applications, most of their structure of motor are with rotational shaft and supported by bearings at both ends of motor flanges. But some of the seal-less canned motor pump are made of plastic or with plastic, lining, hereafter call it plastic seal-less canned motor pump for highly corrosion-resistance and leak-proof applications, for example, precise etching process in PCB manufacturing a metallic seal-less canned motor pump cannot serve for the application, and some features of the plastic seal-less canned motor pump inherit from plastic seal-less magnetic coupling pump, some of them are stationary shaft design and containment shell structure, and the plastic seal-less canned motor pump is integrated with permanent magnet motor to replace the conventional induction motor and the magnetic coupling. The objects of the plastic seal-less canned motor pump are to have smaller size to save installation space, higher performance motor to improve application range of the pump and less parts to increase reliability; moreover, as it is easier to adjust discharge flow rate and head by adjusting rotation speed, and, thereby better satisfying a wider requirement in the manufacturing process.

Referring to FIG. 1, a conventional permanent magnet canned motor pump includes a stationary shaft supported at both shaft ends. The pump comprises a pump casing 4, an impeller 5, a containment shell 41, a stationary shaft 3, a front shaft holder 31 and a canned motor 8; wherein, the pump casing 4 is provided with an inlet 44, an outlet 45 and a flow channel 47, which is used to install the impeller 5. An inlet thrust ring 46 is provided in an interior side of the pump casing 4 at the inlet 44, to couple with an impeller wear ring 53 at the inlet side of the impeller 5, constituted as an axial thrust bearing.

The front shaft holder 31 is fixed at entrance of the pump casing 4 and axially penetrated through hole 54 on the impeller hub 52 to support front end of the stationary shaft 3.

The impeller 5 is installed inside the pump casing 4, impeller huh 52 is a collar structure which is axially extended backward and is used to conjunct with an axially extended part 76 of a motor rotor 7, thereby constituting the impeller 5 and the motor rotor 7 as one integral rotational unit; in many conditions, the motor rotor 7 and the impeller hub 52 are made as one unit by plastic injection directly.

The containment shell 41 of the canned motor 8 is a cup-shape structure, and the front-end flange 411 is combined with the pump casing 4 and the flange 811 of the motor 8 to prevent corrosive liquid from leakage and to enhance a sealing ability. A column part 412 of the containment shell 41 is sheathed into an inner circumference of the motor stator 83 to isolate corrosive liquid, thereby preventing the motor winding 831 from being corroded. The central part of bottom of the containment shell 41 provides with a containment shell holder 413, a recessed blind-hole structure, to support the other end of the stationary shaft 3 and to fix a thrust bearing 414 at the containment shell 41; An inner space 415 of the containment shell 41 is used to install the stationary shaft 3 and the motor rotor 7.

The stationary shaft 3 is supported at both ends and is made of ceramic material which is corrosion resistant and abrasion resistant, both ends of which are supported and fixed respectively by the front shaft holder 31 and the containment shell holder 413, and a central part of which is coupled with bearings 77, 78 to support rotation of the motor rotor 7.

The canned motor 8 comprises a motor stator 83, a motor casing 81, a motor rear casing 82, a containment shell 41, a motor rotor 7 and a stationary shaft 3, wherein the motor stator 83 is installed in the motor casing 81, the motor rear casing 82 is fixed on the motor casing 81. A central part of the motor rear casing 82 is provided with a recessed shaft support seat 821, to fix the containment shell holder 413 on the containment shell 41, to enhance supporting intensity of the stationary shaft; and a flange 811 at the pump side of the motor casing 81 is used to tightly lock the flange 411 and the pump casing 4 together, so as to prevent corrosive liquid from leakage. The motor stator 83 and stator winding 831 are completely sealed by the containment shell 41 to prevent from leakage and contacting with corrosive liquid. The lower side of the motor rear casing 82 is provided with an exit port 822 of electric power cable, such electric power cable of a motor driver can be connected with the stator winding 831 to drive the motor 8.

The motor rotor 7 is made of a set of permanent magnets 71 and a yoke of rotor 72 made of silicon steel sheet metal, after being assembled, it is enclosed by a plastic material with corrosion-resistant properties to form a seam-less collar-shape encapsulated rotor 74. A hollow part of the rotor 7 is provided with two bearings 77 and 78 to couple with the stationary shaft 3, forming a hydraulic bearing system to support rotation and power transmission of the rotor 7. The axially extended part 76 is a part of the rotor 7 with rigidity and intensity properties in cylindrical structure, conjunct with the impeller hub 52 to effectively transfer power from the rotor 7, in many conditions a motor rotor 7 and the impeller huh 52 are made as one integral unit by plastic injection directly.

Referring to FIG. 2, another embodiment of a conventional permanent magnet canned motor pump with a cantilever shaft; the pump comprises a pump casing 4, an impeller 5, a containment shell 41, a stationary shaft 3 and a canned motor 8, wherein the pump casing 4 has an inlet 44, an outlet 45 and a flow channel 47, which is for the installation of impeller 5. An inlet thrust ring 46 is provided in an interior side of the pump casing 4 at the inlet 44, to couple with an impeller wear ring 53 at an inlet side of the impeller 5, constituting an axial thrust hearing.

The impeller 5 is installed inside the pump casing 4, and an impeller hub plate 55 is provided with plural holes 54 to serve as circumfluence holes for internal lubricant circulation and to serve as balance holes for removing axial thrust force, as well. An impeller hub 52 is a collar structure which is extended axially backward and is conjunct with an axially extended part 76 of a motor rotor 7, thereby constitutes the impeller 5 and the motor rotor 7 as one integral unit; in many conditions, the motor rotor 7 and the impeller hub 52 are injected integrally as one integral unit.

The containment shell 41 of the canned motor 8 is a cup-shape structure; the front-end flange 411 is combined with the pump casing 4 and the flange 811 of the motor 8 to prevent corrosive liquid from leakage and to enhance a sealing ability. A column part 412 of the containment shell 41 is sheathed into an inner circumference of the motor stator 83 to isolate corrosive liquid, thereby preventing the motor winding 831 from being corroded; at the bottom of the containment shell 41 is reinforced by a completely enclosed rigid structure member 416, wherein a central hole of the rigid structure member 416 is used to hold and to support one end of the stationary shaft 3; an inner space 415 of the containment shell 41 is used to install the stationary shaft 3 and the motor rotor 7.

The stationary shaft 3 is a cantilever shaft supported at one end by a shaft holder 416 in containment shell 41, made of a ceramic material which is corrosion resistant and abrasion resistant, and the shaft holder 416 is a rigid structure member enclosed at the bottom of the containment shell 41; and the central part of the stationary shaft 3 is coupled with the bearings 77, 78 to support the rotation of the motor rotor 7.

The canned motor 8 comprises a motor stator 83, a motor casing 81, a motor rear casing 82, a containment shell 41, a motor rotor 7 and a stationary shaft 3. The motor stator 83 is installed in the motor casing 81, the motor rear casing 82 is fixed on the motor casing 81. The flange 411 of the containment shell 41 is pressed by the pump casing 4 and a flange 811, at pump side of the motor casing 81, to tightly lock the flange 411 and the pump casing 4 together, so as to prevent corrosive liquid from leakage. The stationary shaft 3 is a cantilever shaft that supported at one end by a shaft holder 41 in containment shell 41, and the shaft holder 416 is a rigid structure member that enclosed at the bottom of the containment shell 41. The motor stator 83 and a stator winding 831 are completely sealed by the containment shell 41 to prevent from leakage of and contact with corrosive liquid. An underside of the motor rear casing 82 is provided with an exit port 822 of electric power cable; such electric power cable of a motor driver can be connected with the stator winding 831 to drive the motor 8.

The motor rotor 7 is made of a set of permanent magnets 71 and a yoke of rotor 72 made of silicon steel sheet metal, after assembled it is enclosed by a plastic material with corrosion-resistant properties to form a seam-less collar-shape encapsulated rotor 74. A hollow part of the rotor 7 is provided with two bearings 77 and 78 to couple with the stationary shaft 3, forming a hydraulic bearing system to support rotation and power transmission of the rotor 7. The axially extended part 76 is a part of the rotor 7 with rigidity and intensity properties in cylindrical structure, conjunct with the impeller hub 52 to effectively transfer power from the rotor 7, in many conditions the motor rotor 7 and the impeller hub 52 are injected integrally as one integral unit.

Referring to FIGS. 1 and 2, when the canned motor 8 is operating, fluid flows along a flowing direction 6 through a flow channel of the impeller 5 to become pressurized fluid, and along a flowing direction 61 and then exits from the outlet 45. In the meantime, part of fluid flows along a flowing direction 62 to enter into the inner space 415 of the containment shell 41, through the back side of the impeller 5, and flows toward the end plate of the containment shell 41 through a gap between the exterior side of the rotor 7 and the inner diameter of the containment shell 41, along a flowing direction 63 then turn around at the bottom of containment shell 41. Next, fluid flows through a gap between the stationary shaft 3 and the bearings 77 and 78 along a flowing direction 64, and finally flows through the holes 54 on the impeller hub 52 to return to the impeller inlet, along a flowing direction 65. This circulation of fluid is used to provide lubrication for the ceramic hearing and remove heat released by the rotor 7 and bearings 77 and 78.

The permanent magnet canned motor pump uses the winding 831 of the motor stator 83 to provide a rotational magnetic field and to interact with a permanent magnetic field of the motor rotor 7 to produce a torque and rotation by a driving method, which is different from the seal-less magnetic drive pump directly coupling an internal rotor with an external rotor of permanent magnet to drive. As the magnetic intensity generated by the winding 831 is dependent on electric current and coils number of the induction winding, which needs a larger size than the permanent magnet to produce a sufficient magnetic flux from stator, and costs money to increase the size of the permanent magnet of the motor rotor 7 also, owing to the structure of the motor rotor 7 should fit with the winding 831 of the motor stator 83 to get a better effect, the size of motor rotor will become larger and more weight also. Nevertheless, it also means that the stationary shaft 3 of the motor 8 will need to carry more loadings of centrifugal force resulted from the more weight of the motor rotor 7. These loadings of centrifugal force come from both residual unbalance of the motor rotor 7 it-self and an eccentric value produced by a gap of bearing 77 and 78 when pump is operating.

From the prior art as the stationary shaft 3 is supported by the plastic parts with lower structural stiffness, an issue of insufficient structural stiffness will be confronted with frequently, especially that if the temperature of transferred liquid goes up to 85° C. Furthermore, due to the differentials in thermal deformation between the plastic member and the ceramic member, and that will reduce the supporting force on the stationary shaft 3 a lot or increase deflection from fixed position of the stationary shaft 3. For instance, the front shaft holder 31 for both end support of the stationary shaft 3 is an obvious example, the structure stiffness of the front shaft holder 31 will be decreased at high temperature, resulting in an increasing eccentric value, and the containment shell holder 413 on containment shell 41 has the same conditions also. Regardless of supporting the stationary shaft 3 at both sides or using the cantilever to support the stationary shaft 3, as the containment shell 41 is thinner at the column part 412, the deformation will be produced easily by fluid temperature or pressure. Although the column part 412 is supported by an inner circumference of the motor stator 83, the fixed position at the bottom of the containment shell 41 of the stationary shaft 3 will still easily be affected resulting in an off-position. When temperature or pressure increases up to that the containment shell 41 can be deformed, the stationary shaft 3 will not be tightly combined with both the front shaft holder 31 and the containment shell holder 413 and get loosened. The other reason of the shaft loosening caused is from the differentials in thermal property between the plastic material and the ceramic material, which results in the stationary shaft 3 loosened.

The permanent magnet canned motor pump is driven by a controller, which could keep motor running in synchronization. The pump rotational speed could be or less than the rated speed in most conditions, but in lower discharge capacity conditions the rated rotation speed could be properly exceeding, those conditions are the output power or the output torque of the permanent canned motor 8 is within a reasonable range and not over limitations. When pump is operated at low rotational speed, it is not necessary to pay attention on the deformation and the centrifugal force issues, but it needs to be concerned if the speed is over the rated rotational speed. However, the centrifugal force applying on the stationary shaft 3 will be increased in squares of the rotation speed, more centrifugal force will get more deformation.

Concluding from the operating requirements of the pump described above, the core issues that need to face with for the application of a high corrosive manufacturing process are:

(1) The issue is the insufficient combining stiffness due to the differentials in thermal properties between the plastic material and the ceramic material;

(2) The issue of decreased intensity of the plastic material under high temperature; and (3) The issue of increased centrifugal force when the operating speed exceeds the rated speed.

To solve the aforementioned issues, the detailed causes of each issue should be analyzed so that the issue can be solved completely. The analyses of the issues are provided as follows:

(1) For the insufficient combining stiffness between plastic and ceramic issue: many corrosion-resistance plastic materials do not have a good physical property to resist thermal deformation and therefore, cannot maintain a tight combination with the ceramic material. However, an additional reinforce structure will be needed.

(2) For the structure stiffness of the plastic material issue: some plastic will be still provided with strong intensity when temperature increases, but their corrosion-resistance is insufficient. The intensity of many corrosion-resistance materials cannot compare with that of the ceramic material, especially that the intensity of material will be decreased significantly when temperature increases. Therefore, a brand new concept about the structure of shaft will be needed.)

(3) For the centrifugal force of motor rotor at high speed issue: as the motor rotor is heavy in mass with a residual unbalance or an eccentric in radius, and the necessary gap in radius for lubrication between the hydraulic bearings and the stationary shaft will increase the centrifugal load of stationary shaft that is the load of centrifugal force on the stationary shaft could be calculated as the mass of motor rotor times the centrifugal acceleration of the rotation, and the centrifugal acceleration of rotation is calculated as the total eccentric radius of rotor times the angular velocity in square, the total eccentric radius is the eccentric radius of unbalance of rotor plus the eccentric radius of the hydraulic bearings. However, a higher stiffness of the stationary shaft and a lower mass of motor rotor will be needed.

There already have related solutions disclosed to solve the aforementioned issues.

The British patent GB2417981 discloses a stationary shaft structure which is a cantilever shaft structure, that at the bottom of the containment shell, a high-rigidity structure member is injected with the stationary shaft to tightly combine the plastic material with the stationary shaft and to improve the supporting strength of the shaft. Some of the wetting parts, like the flange of the containment shell, made of metal material is injected with plastic material; the plastic material used by the referred patent is engineering-grade plastic which is high temperature-resistant and is with high stiffness, but this material cannot withstand high corrosive fluid such as hydrofluoric acid. Because the application of the referred patent is used in cooling water for an engine cooling, there is no corrosion-resistance issue. Secondly, as the thickness of the column part of the containment shell is thin, the stiffness is insufficient to support the load of stationary shaft, which will easily cause the stationary shaft to be displaced or off-positioned.

However, the structure has good solution by using combining materials at the bottom of the containment shell and high temperature applications, but unable to solve structure stiffness issue at the column part of the containment shell and do not meet the requirement of high corrosion application also.

Another solution, the Japanese patent JP2005299559 discloses a stationary shaft structure which is supported at both shaft ends, that uses a front shaft holder at the inlet of the pump casing and a rear shaft holder at the bottom of the containment shell with an additional rigid structure member to intensify. This referred patent focuses on the design to reduce the weight of the rotor and this feature can effectively solve the centrifugal force problem of the rotor, because lower centrifugal force means lower stiffness demand of the stationary shaft. However, the structure is still unable to solve the combining stiffness issue and structure stiffness issue in high corrosion and high temperature applications. The referred patent is only used in the circulation of cooling water in an engine, while not with the corrosive liquid.

As the solutions described above are unable to provide a complete solution to the manufacturing process of high corrosive liquid, a better solution is provided by the present invention to satisfy requirements of the aforementioned issues.

SUMMARY OF THE INVENTION

Therefore the primary object of the present invention is to provide a canned motor pump, wherein a cantilever shaft fixed at one shaft end being improved further, allowing intensity of a stationary shaft to satisfy requirements of all kinds, such as various shaft power and high rotational speed. In addition, a sealing function of a containment shell is improved to satisfy requirements of corrosion-resistance to all kinds of chemical fluid, due to the creative structure better satisfy requirement of structural intensity in high temperature applications.

For enabling a further understanding of the said subjects and the technological methods of the invention herein, the brief description of the drawings below is followed by the detailed description of the preferred embodiments.

DETAILED DESCRIPTION OF THE PREFERRED EMBODIMENTS

Figure 1:
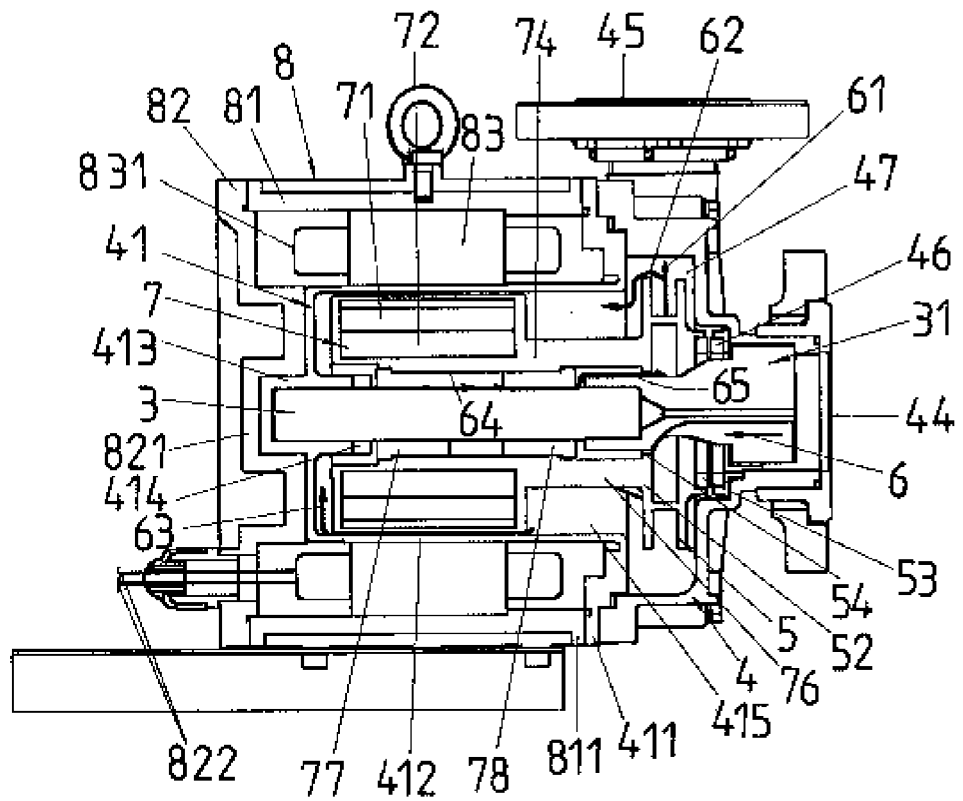
FIG. 1 shows a cross-sectional view of a conventional canned motor pump with a stationary shaft supported at both shaft ends.
Figure 2:
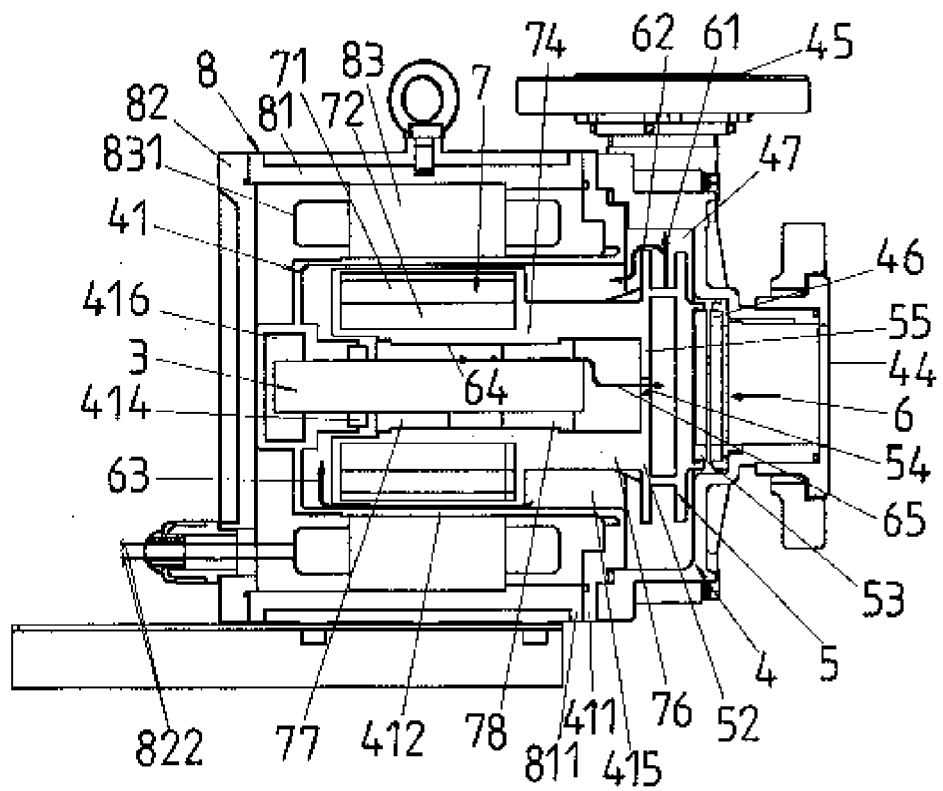
FIG. 2 shows a cross-sectional view of another conventional canned motor pump with a cantilever shaft.
Figure 3:
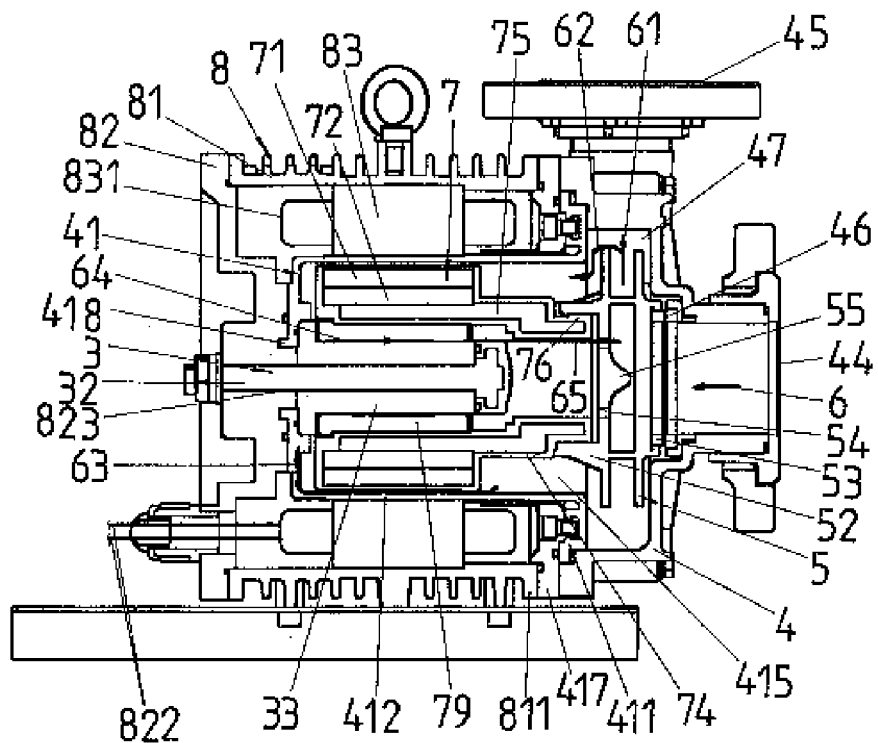
FIG. 3 shows a cross-sectional view of a canned motor pump of an embodiment of the present invention.

Referring to FIG. 3, a canned motor pump of the present invention is with a cantilever shaft and comprises a pump casing 4, an impeller 5 and a canned motor 8.

The pump casing 4 is provided with an inlet 44, an outlet 45 and a flow channel 47, which contains the impeller 5. An inlet thrust ring 46 is provided in an interior side of the pump casing 4 at the inlet 44 to couple with an impeller wear ring 53 at an inlet side of the impeller 5, constituting an axial thrust bearing.

The impeller 5 is installed inside the pump casing 4, and an impeller hub plate 55 is provided with plural holes 54 to serve as circumfluence holes for internal lubricant circulation and to serve as balance holes for reducing axial thrust as well. An impeller hub 52 is a collar structure which is extended axially and is used to combine with axially extended part 76 of a motor rotor 7, thereby constituting the impeller 5 and the motor rotor 7 as one integral unit.

The canned motor 8 comprises a motor stator 83, a motor casing 81, a motor rear casing 82, a containment shell 41, a motor rotor 7 and a stationary shaft 3. The motor stator 83 is installed in the motor casing 81, the motor rear casing 82 is fixed on the motor casing 81, flange 411 of the containment shell 41 is combined with a back plate 417 to form a rigid flange structure, and flange 811 at pump side of the motor casing 81 is used to tightly lock the flange 411 and the pump casing 4, so as to prevent containment shell from leakage. The motor stator 83 and stator winding 831 are completely sealed by the containment shell 41 to prevent from the leakage and contacting with corrosive fluid. An exit port under the motor rear casing 82 enables the electric power cable 822 to connect a controller with the stator winding 831 to drive the motor 8.

The motor rotor 7 of the canned motor 8 comprises a set of permanent magnets 71, a rotor yoke 72 and a bearing seat 75, and is enclosed by a corrosion-resistant resin 74 to form a ring-shape resin encapsulated magnetic rotor 7 without leakage seams. A hollow part at the central part of the rotor 7 is provided with a bearing 79 to couple with the stationary shaft 3, forming a hydraulic bearing system to support rotation and power transmission of the rotor 7. The axially extended part 76 of the rotor 7 is a hollow column structure, reinforced by the bearing seat 75 to increase rigidity and stiffness, and to be used as an adapter to conjunct with the impeller hub 52 to effectively transfer power of the rotor 7.

Figure 7:
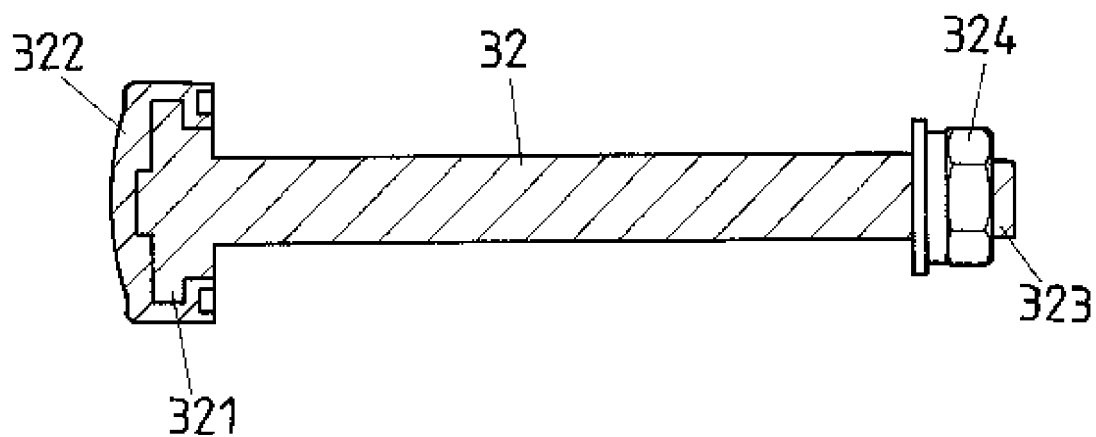
FIG. 7 shows a cross-sectional view of a metal shaft of the present invention.

The containment shell 41 of the canned motor 8 is a cup-shape structure, the front-end flange 411 of which is combined with the back plate 417 first to form a rigid flange structure, and is then combined with the pump casing 4 and the flange 811 of the motor 8 to prevent the containment shell from leakage and to enhance the sealing ability. A column part 412 of the containment shell 41 is sheathed into inner circumference of the motor stator 83 to isolate corrosive fluid, thereby preventing the motor winding 831 from being corroded, at central part of the bottom of the containment shell 41 has an aperture 418 with seal O-rings, and a metal shaft 32 of the stationary shaft 3 could pass through; the metal shaft 32 of the stationary shaft 3 is passed through the central hole 332 of the ceramic shaft sleeve 33, shown in FIG. 7, a circular head 321 at one end of the metal shaft 32 with a O-ring, it could be pressed on front end surface 333 of the ceramic shaft sleeve 33, shown in FIG. 9, and the other end has a teeth part 323 of the metal shaft 32 could go through an aperture 418 with seal O-rings and the hole 823 of the motor rear casing 82, shown in FIG. 8, a nut 324 will be used to fasten the metal shaft 32 in high tension and the ceramic shaft sleeve 33 will be pressed on the motor rear casing 82, to make the stationary shaft 3 in high stiffness condition with good sealing by O-ring. The ceramic shaft sleeve 33 and containment shell 41 can be tightly abutted on the motor rear casing 82 and sealed by O-rings, this way can be assured to have a correct compression on O-rings and to get a highly reliable seal system. An inner space 415 of the containment shell 41 is used to install the stationary shaft 3 and the motor rotor 7.

The stationary shaft 3 of the canned motor 8 is a cantilever shaft, the stiffness of the stationary shaft is completely independent from the structural stiffness of the containment shell 4; the stationary shaft 3 comprises a metal shaft 32, a ceramic shaft sleeve 33, a motor rear casing 82 and the containment shell 41, the metal shaft 32 has a circular head 321 at one end and the other end has a teeth part 323, circular head 321 is enclosed by a resin enclosure 322 provided with an O-ring to achieve functions of sealing and corrosion-resistance, the metal shaft 32 is passed through the central hole 332 of the ceramic shaft sleeve 33, and the other end could go through an aperture 418 with seal O-rings and the hole 823 of the motor rear casing 82. When the metal shaft 32 is tightly locked with the nut 324, then the circular head 321 is tightly abutted on the front end surface 333 of the ceramic shaft sleeve 33, and the rear end surface 335 of the ceramic shaft sleeve 33 can be tightly abutted on the contact surface 825 of the motor rear casing 82, and O-rings at the bottom of the containment shell 41 can be assured to have a correct compression to form a complete seal system, the circular surface 334 of a shaft sleeve 33 is a smooth surface, which constitutes the hydraulic bearing with an inner diameter surface of the bearing 79 of the rotor 7 to provide the rotor 7 with a supporting slid surface needed for rotation, the other thrust surface 331 is provided with a disc-shape thrust ring structure to couple with an axial end surface of the bearing 79 of the rotor 7, thereby constituting the thrust bearing of the motor rotor 7.

Referring to FIG. 3, when the pump is operating, fluid flows along a flowing direction 6 through a flow channel of the impeller 5 to become pressurized fluid along a flowing direction 61 and then exits from the outlet 45. In the meantime, part of fluid flows along a flowing direction 62 to enter into the inner space 415 of the containment shell 41, through the back side of the impeller 5, and flows toward the bottom of the containment shell 41 through a gap between an exterior side of the rotor 7 and an inner side of the containment shell 41, along a flowing direction 63 then turn around at the bottom of containment shell 41. Next, fluid flows through a gap between the stationary shaft 3 and the hearing 79 along a flowing direction 64, and finally flows thorough the holes 54 on the impeller hub 52 to return to the impeller inlet along a flowing direction 65. This circulation of fluid is used to provide lubrication to the ceramic shaft sleeve 33 and remove heat released by the rotor 7 and bearing 79.

Figure 4:
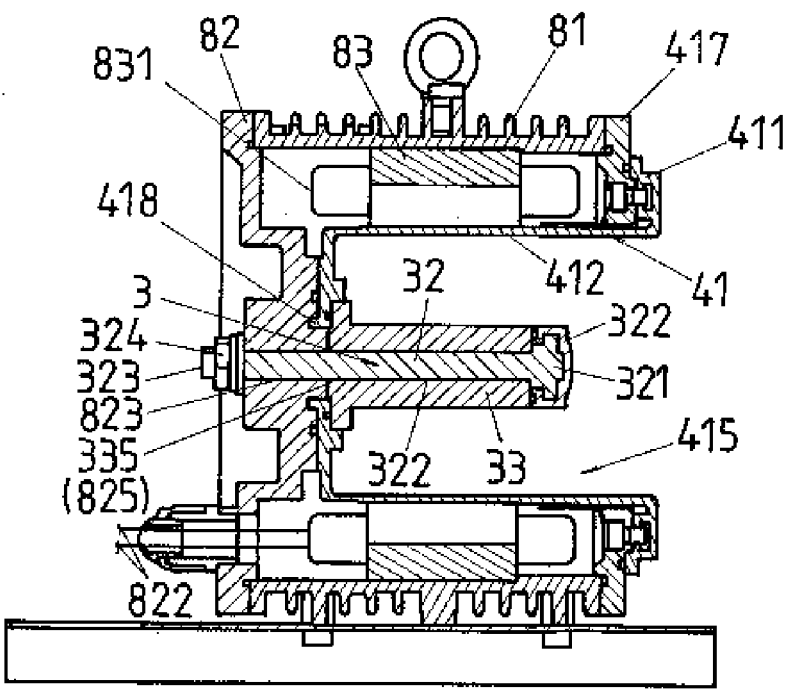
FIG. 4 shows a cross-sectional view of a stationary shaft of the present invention.

Referring to FIG. 4, it discloses a detailed description of the seal system of the containment shell 41 and the stationary shaft 3. The stiffness of the stationary shaft is completely independent from the structural stiffness of the containment shell 41, the cantilever structure of the stationary shaft 3 comprises the ceramic shaft sleeve 33, the metal shaft 32, the motor rear casing 82, and the containment shell 41. The metal shaft 32 of the stationary shaft 3 is passed through the central hole 332 of the ceramic shaft sleeve 33, and the teeth part 323 through an aperture 418 with seal O-rings and the hole 823 of the motor rear casing 82, the intensity of the stationary shaft 3 is due to that a nut 324 of the metal shaft 32 tightly locks teeth part 323 of the metal shaft to generate a strong tension force, such that the tension force will strongly compress at the front end surface 333 of the ceramic shaft sleeve 33 by the circular head 321 of the metal shaft 32, the rear surface 335 of the ceramic shaft sleeve 33 is tightly abutted on the contact surface 825 of the motor rear casing 82, thereby forming the stationary shaft 3 into a complex rigid shaft. Therefore, a supporting force of the stationary shaft 3 is no longer provided by the metal shaft 32 alone, but by the complex structures and the motor rear casing 82. The structural intensity of the stationary shaft 3 of the present invention is able to completely overcome structural weakness of the containment shell 41. The circular head 321 is enclosed by a resin enclosure 322 on which provided with an O-ring to seal the front end surface 333 of the ceramic shaft sleeve 33, such that the rear end surface 335 can be sealed by O-rings at the bottom of the containment shell 41, those O-rings can be assured to have a correct compression to form a complete seal.

Figure 5:
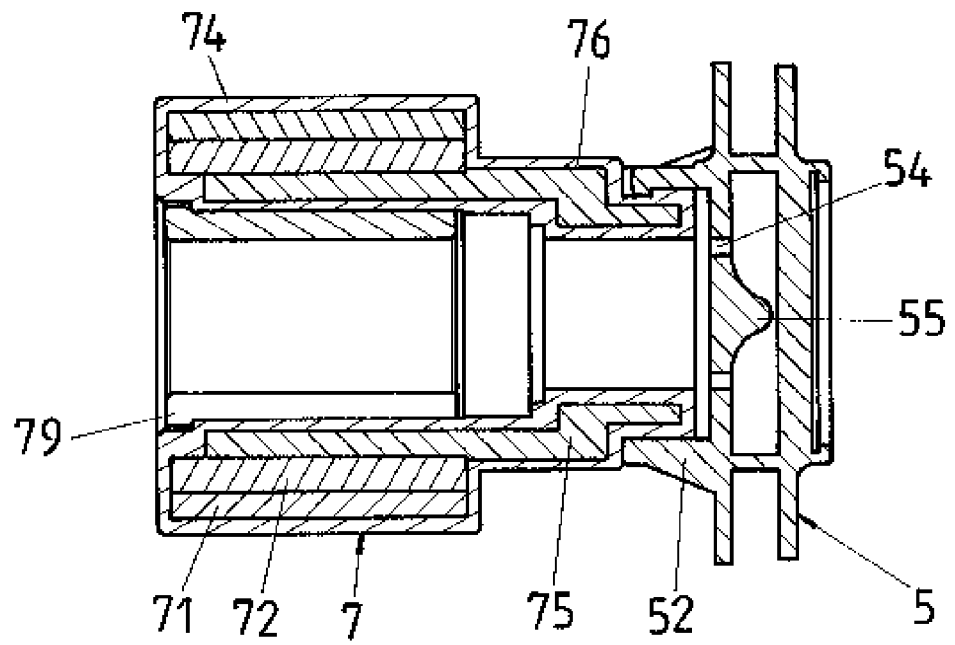
FIG. 5 shows a cross-sectional view of a motor rotor and an impeller of the present invention.

Referring to FIG. 5, it discloses a structural description of the motor rotor 7 that is combined with the impeller 5 as one integral unit. The motor rotor 7 comprises a set of permanent magnets 71, a rotor yoke 72 and a bearing seat 75, and is enclosed by a corrosion-resistant resin 74 to form a ring-shape resin encapsulated magnetic rotor 7 without leakage seams, the motor rotor has light weight features by light weight of the yoke and a light weight high intensity bearing seat 75. As the pump running in high speed, the centrifugal force will be an important issue, some parameters of the motor rotor will contribute to the centrifugal force; the weight of the motor rotor 7 is one of parameters, the others are an eccentric radius of mass in encapsulating process and a gap in radius of bearing 79. In the present invention, to reduce the centrifugal force is to focus on reducing the weights of rotor, most of that is to reduce the mass of the rotor yoke 72 but keep reasonable magnet flux passing through, and let the permanent magnet 71 could offer enough magnetic motive force, by the method of increasing poles of motor to reduce magnetic flux length and to keep a bigger annular space between outside diameter of shaft bearing 79 and inner diameter of the rotor yoke 72. If this annular space is filled with resin to form the encapsulated rotor 74, then the resin thickness is too thick that deformation and off-center can be produced. The present invention uses the light-weight high-intensity bearing seat 75 inserted in the annular space, and to keep the resin in reasonable thickness to overcome the deformation and off-center that might be produced, which will further assure that the resin encapsulation engineering of the rotor 7 will have negligible residual unbalance. The length of the bearing seat 75 covers the total length of the rotor yoke 72 and the axially extended part 76, allowing the axially extended part 76 to be supported and has the best rigidity for power transmission. The impeller hub 52 is an axially extended structure in a collar shape, which is combined with the axially extended part 76 of the rotor 7 to transfer power of the rotor 7.

Figure 6:
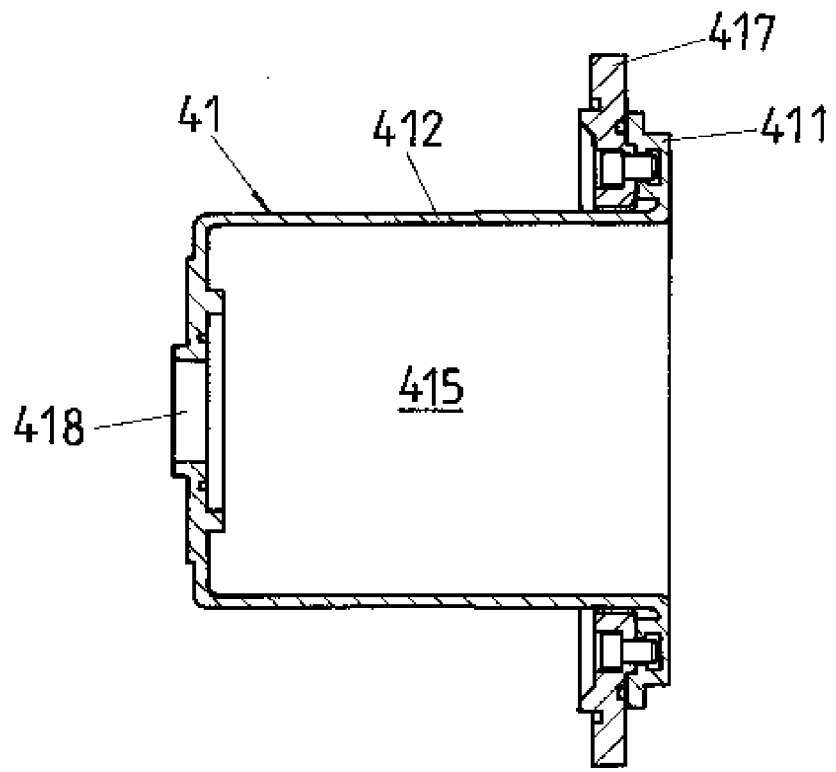
FIG. 6 shows a cross-sectional view of a containment shell of the present invention.

Referring to FIG. 6, the containment shell 41 of the canned motor 8 is a cup-shape structure, the opening side of the containment shell 41 is provided with the flange 411 to combine with the pump casing 4 to constitute the sealed flow channel 47 and the inner space 415. A back plate 417 is on the rear side of the flange 411 to provide the flange 411 with better structural stiffness and to assure that the containment shell 41 and the pump casing 4 will have the best sealing structures to prevent corrosive liquid from leakage. A column part 412 of the containment shell 41 is sheathed into an inner circumference of the motor stator 83 to isolate corrosive liquid, shown in FIG. 4, thereby preventing the motor winding 831 from being corroded. The thickness of the column part 412 should offer fundamental structural stiffness and a margin against corrosion. If the thickness is too thick, the gap between rotor and stator become larger, then the motor performance can be reduced; on the contrary, if the thickness is insufficient, then the life cycle of corrosion resistance will be short. The bottom of the containment shell 41 is provided with the aperture 41 for metal shaft 32 to pass through. To constitute the complete seal of the containment shell 41, the metal shaft 32 is used to combine with the ceramic shaft sleeve 33 and the motor rear casing 82, and keep the containment shell 41 free from shaft stiffness.

Referring to FIGS. 6 to 9, the stationary shaft 3 of the canned motor 8 is a cantilever shaft, comprises a metal shaft 32, a ceramic shaft sleeve 33, a motor rear casing 82 and the containment shell 41; the metal shaft 32 passes through the central hole 332 of the ceramic shaft sleeve 33, the aperture 41 of the containment shell 41 with a seal O-rings and the shaft hole 823 of the motor rear casing 82, one end of the metal shaft 32 is provided with the circular head 321, whereas, the circular head 321 is enclosed by a resin enclosure 322, on which is provided with an O-ring to achieve functions of sealing and corrosion-resistance, the other end of the metal shaft 32 is provided with the teeth part 323. When the metal shaft 32 is installed correctly and the nut 324 is tightly locked, then the circular head 321 is tightly abutted on the front end surface 333 of the ceramic shaft sleeve 33, and the rear end surface 335 of the ceramic shaft sleeve 33 can be tightly abutted on the contact surface 825 of the motor rear casing 82, and O-rings at the bottom of the containment shell 41 can be assured to have a correct compression to form a complete seal system. To constitute the stiffness of the high-rigidity complex stationary shaft. 3 is from the ceramic shaft sleeve 33 tightly locked and compressed together with the motor rear casing 82 by the compression force of the metal shaft 32 with nut 324.

Figure 8:
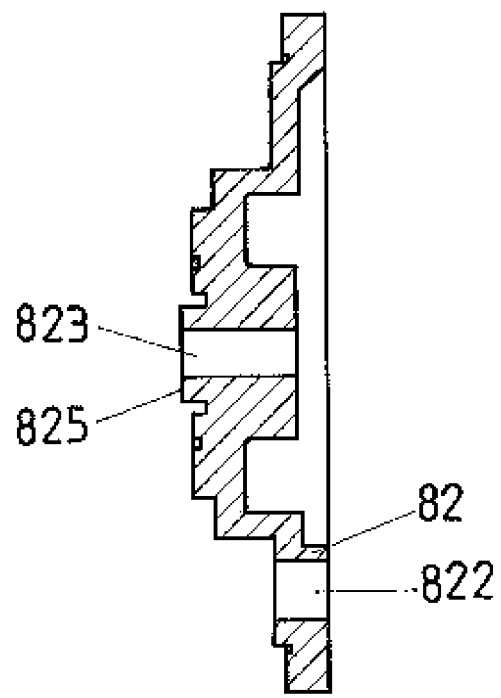
FIG. 8 shows a cross-sectional view of a rear motor casing of the present invention.

Referring to FIG. 8, the motor rear casing 82 is a metallic part and is used to seal the motor winding 831 from being exposed in corrosive air, and to provide the rigid cantilever stationary shaft 3 with the most powerful support. The central hole 823 allows the teeth part 323 of the metal shaft 32 to pass through, and the contact surface 825 is used to couple with the rear end surface 335 of the ceramic shaft sleeve 33 which provides the high-intensity support structure when the ceramic shaft sleeve 33 is compressed. When the containment shell 41 is locked tightly by the stationary shaft 3, the motor rear casing 82 and the ceramic shaft sleeve 33 will correctly assure that the sealing O-rings of the containment shell 41 can be compressed and sealed correctly. The motor rear casing 82 is provided with plural O-rings which are used respectively to provide sealing to the motor winding 831 and the containment shell 41. The motor rear casing 82 is also provided with the exit port of the electric power cable 822 which allows the electric power cable of the controller to connect to the motor winding 831.

Figure 9:
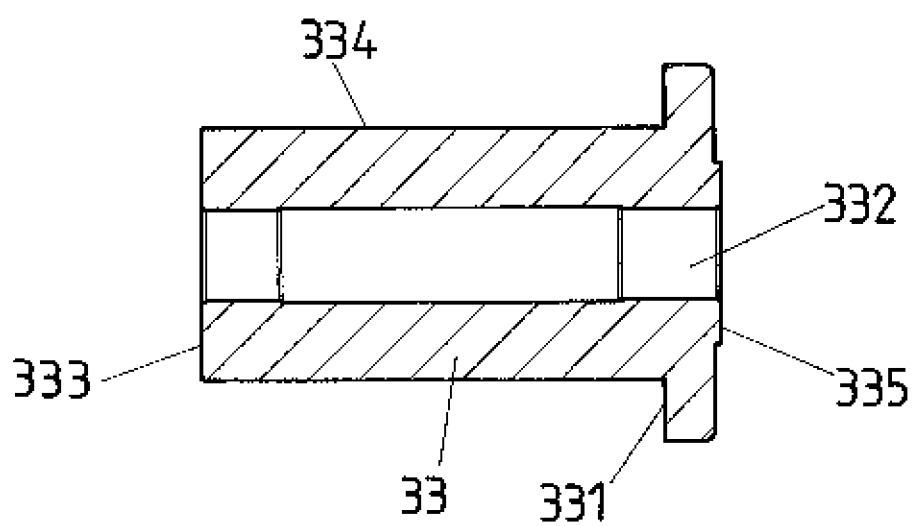
FIG. 9 shows a cross-sectional view of a ceramic shaft sleeve of the present invention.

Referring to FIG. 9, the ceramic shaft sleeve 33 is a pipe-shape structure, the central hole 332 of which allows the metal shaft 32 to pass through. The front end surface 333 is used to seal and compress the circular head 321 of the metal shaft 32, the rear end surface 335 is used to seal and compress the contact surface 825 of the motor rear casing 8Z a circular surface 334 of a shaft sleeve 33 is a smooth surface, which constitutes the hydraulic bearing with an inner diameter surface of the bearing 79 of the rotor 7 to provide the rotor 7 with a supporting slid surface needed for rotation, the other thrust surface 331 is provided with a disc-shape thrust ring structure to couple with an axial end surface of the bearing 79 of the rotor 7, thereby constituting the thrust bearing of the motor rotor 7.

The cantilever stationary shaft 3 of the present invention completely overcomes the low stiffness issues of shaft support structure, the insufficient combining stiffness issue and the centrifugal force issue of the prior art. The stationary shaft 3 has different design conception in structure, so the intensity of the containment shell 41 is free from stiffness of shaft 3, also overcomes the combining stiffness issue because of using the reasonable O-rings seal system, and no more any differential thermal properties between plastic and ceramic. When temperature and pressure increase to that the containment shell 41 be deformed, the stationary shaft 3 will continue to provide the sufficient stiffness without being affected at all. When the operating speed exceeds the rated speed, the light weight rotor of motor will generate less centrifugal force and the stationary shaft 3 can completely withstand the centrifugal force which increases in ratio of squares of revolutions.

Concluding from the above, in accordance with the present invention, the cantilever stationary shaft improvement of the canned motor pump comprise of a containment shell, the rear motor casing, the ceramic shaft sleeve and the metal shaft. This high-rigidity simple structure can effectively support the rotation of the motor rotor and maintain sealing the corrosive fluid inside the pump without leakage, and all features are free from insufficient stiffness issues due to differential thermal properties between the plastic material and the ceramic material, and low intensity of the plastic material under high temperature and high centrifugal force from high rotation speed.

What is claimed is:

1. A canned motor pump, comprising:
   a pump casing, an impeller and a canned motor;
   said pump casing is provided with an inlet, an outlet and a flow channel, which is used to hold the impeller;
   said impeller is installed inside the pump casing, has an impeller hub plate provided with plural holes for reducing axial thrust; the impeller hub has a collar structure which is extended axially and is conjunct with an axially extended part of a motor rotor, thereby constituting the impeller and the motor rotor as one integral unit;
   said canned motor comprises a motor stator, a motor casing, a motor rear casing, a containment shell, a motor rotor and a stationary shaft;
   wherein the motor stator is installed in the motor casing, the rear motor casing is fixed on the motor casing;
   wherein a flange at pump side of motor casing is used to tightly lock a back plate of the containment shell;
   wherein a front-end flange of the containment shell is combined with the back plate to form a rigid flange structure, and the pump casing is locked with the back plate;
   the motor stator with a stator winding is completely sealed by the containment shell;
   the lower side of the rear motor casing is provided with an exit port for an electric power cable of a controller, and the controller can be connected with the stator winding to drive the motor;
   the motor rotor comprises a set of permanent magnets, a rotor yoke, a bearing seat, and is enclosed by a corrosion-resistance resin to form a ring-shape resin encapsulated magnetic rotor without leakage seams; the motor rotor has light weight features by light weight of the rotor yoke and a bearing seat with light weight high intensity, the motor has more poles to reduce magnetic flux length and to keep a bigger annular space between shaft and inner diameter of the rotor yoke;
   the bearing seat is inserted in the inner diameter of the rotor yoke, has the length to cover the total length of the rotor yoke and the axially extended part, has the best rigidity for power transmission;
   the motor rotor has the axially extended part, which is combined with the impeller to transfer power; a hollow part of the rotor is provided with a bearing to couple with the stationary shaft, constituting a hydraulic bearing system to support rotation;
   the containment shell of the canned motor is a cup-shape structure with a front-end flange; a column part of the containment shell is sheathed into an inner circumference of the motor stator; there is an aperture with O-ring seal slots at central part of the bottom of the containment shell, that the metal shaft of the stationary shaft passing through;
   the stationary shaft of the canned motor is a cantilever shaft which comprises a ceramic shaft sleeve and a metal shaft;
   wherein the metal shaft has one end provided with a circular head, whereas, enclosed by a resin enclosure on which is provided with an O-ring to achieve functions of sealing and corrosion-resistance, the other end of the metal shaft is provided with a teeth part could locked by nut;
   wherein the ceramic shaft sleeve is cylindrical type with central hole, at the rear end with a disc-shape thrust ring structure;
   the assembly of the stationary shaft is passing the metal shaft through the central hole and the circular head is tightly abutted on the front end surface of the ceramic shaft sleeve when tightly lock the nut;
   the fixing of the stationary shaft is passing the teeth part of the metal shaft through an aperture of the containment shell and a shaft hole of the motor rear casing, the rear end surface of the ceramic shaft sleeve can be tightly abutted on the contact surface of the motor rear casing, also the rear end surface of the ceramic shaft sleeve abutted on O-rings at the bottom of the containment shell could be assured to have a correct compression to form a complete sealing system;
   the stiffness of the high-rigidity composited stationary shaft is owing to that the ceramic shaft sleeve and the motor rear casing are tightly locked and compressed together by the tension force of the metal shaft with nut, a circular surface of the ceramic shaft sleeve constitutes the hydraulic bearing with an inner diameter surface of the bearing of the rotor to provide the rotor with a supporting slid surface needed for rotation, other thrust surface is provided with the disc-shape thrust ring structure to couple with an axial end surface of the bearing of the motor rotor, thereby constituting a thrust bearing of the motor rotor.

2. A canned motor pump with a cantilever shaft, in which the canned motor comprises
   a motor stator, a motor rotor, a stationary shaft, a containment shell, a motor casing and a rear motor casing;
   wherein the motor stator is installed in the motor casing, the rear motor casing is fixed on the motor casing;
   wherein the flange at pump side of the motor casing is used to tightly lock a back plate of the containment shell, also the front-end flange of the containment shell is locked with the back plate to form a rigid flange structure,
   the motor stator with a stator winding is completely sealed by the containment shell;

an underside of the rear motor casing is provided with an exit port for the electric power cable of a controller, and the controller can be connected with the stator winding to drive the motor;

the motor rotor comprises a set of permanent magnets, a rotor yoke and a bearing seat, and encapsulating resin, the motor rotor is enclosed by a corrosion-resistance resin to form a ring-shape resin encapsulated magnetic rotor without leakage seams, and the rotor with an axially extended part, through which the power of the motor rotor be transfer to an impeller, and an impeller has a hub with collar shape could combine with the rotor; at the center of the rotor is provided with a bearing to couple with the stationary shaft, forming hydraulic bearing system to support rotation;

the motor rotor has light weight features by light weight of the yoke and the bearing seat, the motor rotor has more poles to reduce magnetic flux length and to keep a bigger annular space between the stationary shaft and inner diameter of the rotor yoke;

the bearing seat is inserted in the inner diameter of the yoke with light weight high intensity features, with the length to covers the total length of the rotor yoke and the axially extended part, and has the best rigidity for power transmission;

the containment shell of the canned motor is a cup-shaped structure with a front-end flange; a column part of the containment shell is sheathed into an inner circumference of the motor stator; there is an aperture with O-ring seal slots at central part of the bottom of the containment shell that the metal shaft of the stationary shaft passing through;

the stationary shaft of the canned motor is a cantilever shaft which comprises a ceramic shaft sleeve and a metal shaft;

wherein the metal shaft has one end provided with a circular head, whereas, enclosed by a resin enclosure on which is provided with an O-ring to achieve functions of sealing and corrosion-resistance, the other end of the metal shaft is provided with a teeth part could locked by nut;

wherein the ceramic shaft sleeve is cylindrical type with central hole, at the rear end with a disc-shape thrust ring structure;

the assembly of the stationary shaft is passing the metal shaft through the central hole and the circular head is tightly abutted on the front end surface of the ceramic shaft sleeve when tightly lock the nut;

the fixing of the stationary shaft is passing the teeth part of the metal shaft through an aperture of the containment shell and a shaft hole of the motor rear casing, the rear end surface of the ceramic shaft sleeve can be tightly abutted on the contact surface of the motor rear casing, also the rear end surface of the ceramic shaft sleeve abutted on O-ring is at the bottom of the containment shell could be assured to have a correct compression to form a complete sealing system;

the stiffness of the high-rigidity complex stationary shaft is owing to that the ceramic shaft sleeve and the motor rear casing are tightly locked and compressed together by the tension force of the metal shaft with nut, a circular surface of the ceramic shaft sleeve constitutes the hydraulic bearing with an inner diameter surface of the bearing of the rotor to provide a supporting slid surface needed for rotation, other thrust surface is provided with the disc-shape thrust ring structures with an axial end surface of the bearing of the motor rotor, thereby constituting a thrust bearing of the motor rotor.

3. A canned motor pump, the stationary shaft of the canned motor is a cantilever shaft, wherein the stationary shaft is fixed on a motor rear casing and a containment shell to constitute a complete shaft sealing system, the stationary shaft comprises a ceramic shaft sleeve and a metal shaft;

wherein the ceramic shaft sleeve is cylindrical type with central hole, at the rear end with a disc-shape thrust ring structure;

wherein the metal shaft passes through the central hole of the ceramic shaft sleeve, the aperture of the containment shell with seal O-rings and the shaft hole of the motor rear casing; one end of the metal shaft is provided with a circular head, whereas, the circular head is enclosed by a resin enclosure on which is provided with an O-ring to achieve functions of sealing and corrosion-resistance, the other end of the metal shaft is provided with a teeth part; when tightly lock a nut, then the circular head is tightly abutted on the front end surface of the ceramic shaft sleeve, and the rear end surface of the ceramic shaft sleeve can be tightly abutted on the contact surface of the motor rear casing, and O-rings on the bottom of the containment shell could be assured to have a correct compression to form a complete seal system;

the stiffness of the high-rigidity complex stationary shaft is owing to that the ceramic shaft sleeve and the motor rear casing are tightly locked and compressed together by the tension force of the metal shaft with the nut, the circular surface of the shaft sleeve constitutes the hydraulic bearing with an inner diameter surface of the bearing of a rotor to provide a supporting slid surface needed for rotation; the thrust surface of the ceramic sleeve is provided with a disc-shape thrust ring structure to couple with an axial end surface of the bearing of the rotor, thereby constituting the thrust bearing of the motor rotor.

4. A canned motor pump, the motor rotor of the canned motor is a light weight resin encapsulated rotor, wherein the rotor comprises a bearing seat, a set of permanent magnets, a rotor yoke and an encapsulation resin;

the rotor is enclosed by corrosion-resistance resin to form a ring-shape resin encapsulated magnetic rotor without leakage seams; the motor rotor has light weight features by light weight of the yoke and a bearing seat with light high intensity, the rotor has more poles to reduce magnetic flux length and to keep a bigger annular space between shaft and inner diameter of the rotor yoke, the bearing seat be inserted in the inner diameter of the rotor yoke, the length of the bearing seat covers the total length of the rotor yoke and an axially extended part of the rotor, and has the best rigidity for power transmission to transfer power of the rotor; a hollow part of the rotor is provided with a bearing to couple with a stationary shaft, constituting a hydraulic bearing system to support rotation and power transmission.

5. The canned motor pump according to claim 1, wherein, the containment shell of the canned motor is a cup-shape structure, the front-end flange of which is first combined with the back plate to form a rigid flange structure, and is then combined with the pump casing and the flange of the motor casing to prevent corrosive fluid from leakage and to enhance sealing ability.

6. The canned motor pump according to claim 2, wherein, the containment shell of the canned motor is a cup-shape structure, the front-end flange of which is first combined with the back plate to form a rigid flange structure, and is then combined with the pump casing and the flange of the motor casing to prevent corrosive fluid from Leakage and to enhance sealing ability.

7. The canned motor pump according to claim 1, wherein the motor rear casing is a two-piece structure and is a metallic part.

8. The canned motor pump according to claim 2, wherein the motor rear casing is a two-piece structure and is a metallic part.

9. The canned motor pump according to claim 3, wherein the motor rear casing is a two-piece structure and is a metallic part.

\* \* \* \* \*